April 25, 1961 W. KARLSSON 2,981,581

CABINET FOR DISC RECORDS

Filed June 9, 1958

INVENTOR.
WALDEMAR KARLSSON
BY
Charles Richard Werner
ATTORNEY

United States Patent Office 2,981,581

Patented Apr. 25, 1961

2,981,581

CABINET FOR DISC RECORDS

Waldemar Karlsson, Niles, Ill.
(2 Garden Court, Prospect Heights, Ill.)

Filed June 9, 1958, Ser. No. 740,808

1 Claim. (Cl. 312—15)

This invention relates in general to cabinets for disc records and in particular to a cabinet having facilities for vertical storage of phonograph or other disc records with means for selectively ejecting desired records in a simple and expeditious manner.

While it is realized that the prior art discloses record cabinets somewhat similar in nature, insofar as I am aware none of the previous devices are as simple and compact and inexpensive to make as my device.

The objects of my invention are, first, to provide a cabinet for disc records in which the specific design and assembly of the elements involved make it possible to store a large number of records in a cabinet of small proportions and yet provide means for selectively ejecting any desired record without interference with another record.

Second: to provide means for simply interlocking the record supporting elements so as to permit independent movement of each record support.

Third: to provide a completely new simple and inexpensive construction for a record cabinet whereby the entire unit can be made and sold at a very low price.

Other objects and advantages as well as the construction and manner of use of my invention will be obvious from the following specifications in connection with the accompanying drawing in which.

Figure 1:
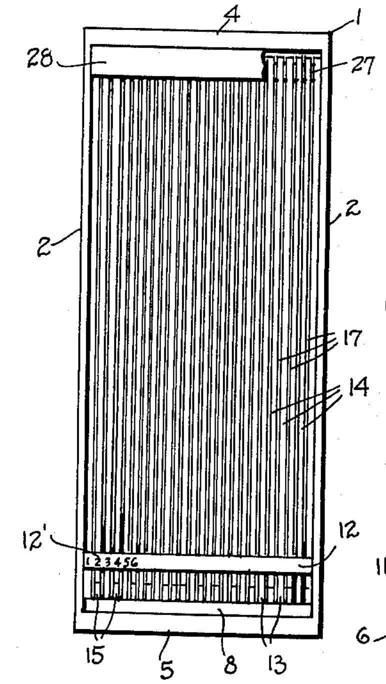
Fig. 1 is a front elevational view of a record cabinet constructed in accordance with my invention.

Referring now to the drawing by numerals of reference, 1 designates a record cabinet having sides 2, back 3, top 4 and bottom 5, the bottom having a forwardly extending lip 6.

A fulcrum bar 7 is positioned transversely on the bottom of the cabinet on an elevating pad 8, the ends of the fulcrum bar 7 resting in slots 9 of brackets 10, said brackets being suitably fastened in cabinet 1 and having angular extensions 11 to which plate 12 is secured, said plate bearing indicia 12′ to indicate record numbers. The plate 12 has the additional function of acting as a stop for the disc records as will be hereinafter explained.

The record supports comprise a plurality of support bars 13 slightly greater in width than the width of a record 14, alternating bars having reduced finger portions 15 for ease in selection. A notch 16 in each support bar 13 is adapted to rest and rock on fulcrum bar 7.

A vertical spacing member 17 is formed of a folded single piece of material, cardboard being found to be quite suitable, and provides a vertical slot 18, the spacing member 17 being secured to one side of the support bar 13 adjacent the front end thereof, staples 19 being quite adequate for fastening means. This spacing member 17 acts to spread the record support bars 13 sufficiently for ease of operation of individual bars.

Figure 4:
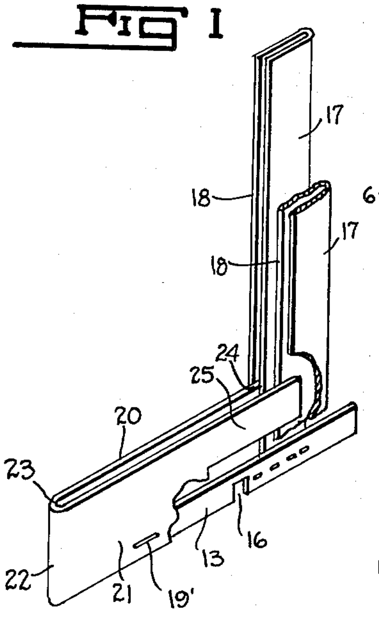
Fig. 4 is an isometric view of a record support with parts parts being broken away to better illustrate certain other parts.
Figures 2, 3, 5, 6:
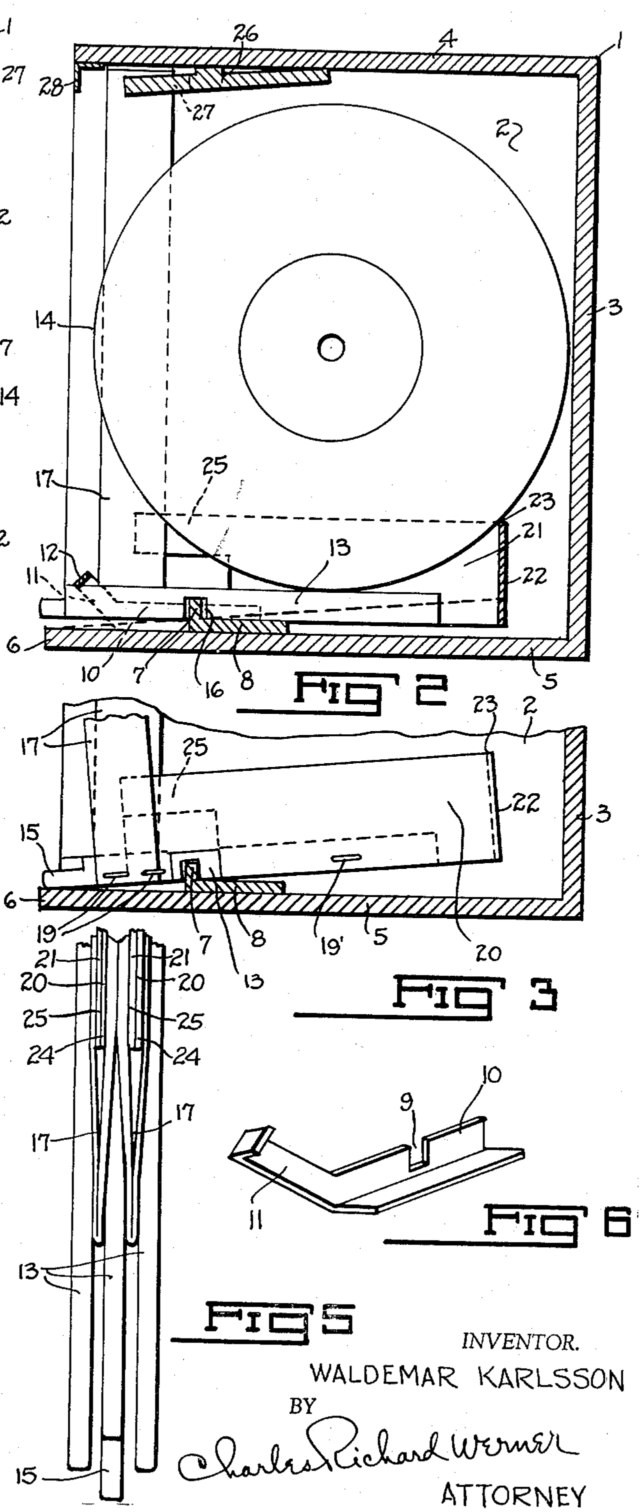
Fig. 2 is a side sectional view through the cabinet.
Fig. 3 is a fragmentary sectional view similar to Fig. 2 showing the record support tilted for ejection of a record.
Fig. 5 is an enlarged fragmentary top plan view of the forward end of several record supports showing their interrelation.
Fig. 6 is an isometric view of the fulcrum bar bracket.

Side walls 20 and 21 are provided on the support bar 13 and join at the rear end 22 to form a stop or rest 23 for the record. Said side walls are also stapled or otherwise suitably fastened to the support bar 13 by staples 19′. The front end 24 of side wall 20 preferably rests between the two sides of vertical spacing member 17, and the front end 25 of side wall 21 may be reduced in area and is free of the support bar 13, and as shown in Figs. 4 and 5 slidably rests between the sides of an adjacent vertical spacing member 17 to form an interlocking member in relation to member 17 so that either or both record supports may be moved freely without interference by the other.

An upper spacing member and guide 26 is secured to the top 4 of the cabinet and is provided with a plurality of slotted openings 27 in which the upper end of each vertical spacing member 17 is received for rocking movement therein. The angle member 28 positioned transversely across the top front of the cabinet acts as a stop for the upper end of the spacing member 17.

With the records 14 in place, they bear against the stop or rest 23 and when a record is desired it can first be looked up on a record list to determine its number; then the bar with the selected number is depressed and this will bring the record gently forward to gravitate on the bar 13, the record coming to rest against the number plate 12 with a sufficient portion of the record exposed to be grasped and removed from the cabinet.

The front end 25 of side wall 21 slidably resting in the vertical slot of spacing member 17 will act as an interlocking means to keep the spacing members 17 in alignment and make it easy to guide records into and out of their supports.

From the foregoing it will be seen that I have provided a new and novel construction for record cabinets which will result in a very inexpensive device, compact and simple in operation.

Obviously, changes in form, proportion and minor details of construction may be resorted to without departing from the spirit of my invention and I reserve all rights to such changes as come within the scope of these specifications and the claim which follows.

What I claim as new and desire to secure by Letters Patent is:

In a cabinet for disc records, a plurality of juxtaposed rockable record supports, the records resting directly on said supports, said record supports each including a rockable bar, a transverse fulcrum in the base of the cabinet, each bar being notched to engage the fulcrum, a vertical spacing member secured to one side of each bar adjacent the front end of said bar, said vertical spacing member having a vertical slot opening toward the rear of the cabinet, upstanding side walls on each bar joined at the rear and forming a pocket for reception of a disc record, the front end of one side wall being reduced in area and extending into the vertical slot in the vertical spacing member, the front end of the other side wall extending into and being freely movable in relation to the vertical slot of the vertical spacing member of the adjacent record support.

References Cited in the file of this patent

FOREIGN PATENTS

| | | |
|---|---|---|
| 16,154 | Great Britain | 1913 |
| 184,396 | Great Britain | Aug. 17, 1922 |
| 685,404 | France | Mar. 31, 1930 |
| 345,439 | Great Britain | Mar. 26, 1931 |
| 136,443 | Sweden | July 8, 1952 |